(12) United States Patent
Lemieux

(10) Patent No.: US 6,619,417 B2
(45) Date of Patent: Sep. 16, 2003

(54) SNOWMOBILE SLIDE RAIL SYSTEM

(75) Inventor: Rene Lemieux, Granby (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 10/141,855

(22) Filed: May 10, 2002

(65) Prior Publication Data

US 2002/0153186 A1 Oct. 24, 2002

Related U.S. Application Data

(63) Continuation of application No. 10/082,349, filed on Feb. 26, 2002, now abandoned.
(60) Provisional application No. 60/270,879, filed on Feb. 26, 2001.

(51) Int. Cl.$^7$ ............................................. B62M 29/00
(52) U.S. Cl. ........................ 180/182; 180/190; 180/193; 305/127
(58) Field of Search ................................ 180/182, 184, 180/186, 192, 193, 190; 305/120, 124, 127

(56) References Cited

U.S. PATENT DOCUMENTS

| | | | | |
|---|---|---|---|---|
| 3,485,312 A | * | 12/1969 | Swenson et al. | 180/193 |
| 3,637,035 A | * | 1/1972 | Washburn | 180/192 |
| 3,658,392 A | | 4/1972 | Perreault et al. | |
| 3,690,394 A | * | 9/1972 | Skime | 305/127 |
| 3,711,164 A | * | 1/1973 | Chaumont | 180/193 |
| 3,727,709 A | * | 4/1973 | Newman | 180/193 |
| 3,750,775 A | * | 8/1973 | Valentine | 180/193 |
| 3,770,330 A | * | 11/1973 | Bombardier | 305/127 |
| 3,788,412 A | * | 1/1974 | Vincent | 180/193 |
| 3,887,243 A | * | 6/1975 | Chaumont | 180/193 |
| 3,948,331 A | * | 4/1976 | Esch | 180/193 |
| 4,546,842 A | * | 10/1985 | Yasui | 180/193 |
| 4,987,965 A | * | 1/1991 | Bourret | 180/193 |
| 5,033,572 A | | 7/1991 | Zulawski | |
| 5,265,692 A | | 11/1993 | Mallette | |
| 5,727,643 A | * | 3/1998 | Kawano et al. | 180/193 |
| 5,860,486 A | | 1/1999 | Boivin et al. | |
| 5,904,216 A | | 5/1999 | Furusawa | |
| 5,904,217 A | * | 5/1999 | Yamamoto et al. | 180/190 |
| 5,947,220 A | * | 9/1999 | Oka et al. | 180/193 |

* cited by examiner

*Primary Examiner*—Lesley D. Morris
*Assistant Examiner*—Daniel Yeagley
(74) *Attorney, Agent, or Firm*—Pillsbury Winthrop LLP

(57) ABSTRACT

A slide rail system of a snowmobile vehicle includes a pair of substantially parallel elongated front slide rails, each front slide rail having a forward end and a rear end, the forward end pivotally connected to a chassis or a front drive axle of the snowmobile. The system also includes a pair of substantially parallel elongated rear slide rails, each rear slide rail having a forward end pivotally connected to the rear end of each front slide rail.

8 Claims, 17 Drawing Sheets

SNOWMOBILE SLIDE RAIL SYSTEM

This application is a continuation of U.S. application Ser. No. 10/082,349, filed Feb. 26, 2002 now abandoned, which is incorporated herein by reference. This application also claims priority to U.S. application Ser. No. 60/270,879, filed Feb. 26, 2001, which is incorporated herein by reference.

FIELD OF THE INVENTION

This invention relates to suspension systems for tracked vehicles, and, more specifically, to a slide rail system for a snowmobile.

BACKGROUND OF THE INVENTION

Generally, suspension systems are very heavy and bulky due to their complexity and the number of parts required. As illustrated in FIGS. 1 and 2, most suspension systems require a pair of elongated slide rails 1 that are curved at their forward end 2 to follow an endless track 3. Front and rear suspension arms 4, 5 link the slide rails 1 and the chassis 6 of the snowmobile 7 together. The front and rear suspension arms 4, 5, together along with the chassis 6 and the slide rails 1, form a parallelogram structure.

One aspect that all prior art suspension systems have in common is the shape of the slide rails 1. Slide rails 1 have generally been structured to include a flat surface 8 toward the rear end of the slide rail 1, which slides along an endless track parallel with the ground. The forward end 2 of the slide rails 1 curves or angles towards the chassis 6 to create an angle of attack ☐ of the track 3. Another aspect that is common to the prior art slide rails is an unsupported front portion of the track between the front drive axle and the forward end 2 of the slide rails.

The distance needed to ensure the minimum amount of traction between the snowmobile track 3 and the ground determines the minimum length of the rear flat surface 8.

Several suspension designs appear in the prior art, a few of which are described briefly below.

U.S. Pat. No. 5,860,486, incorporated herein by reference, describes a suspension system comprising a single, generally centrally mounted structure in a middle portion of the rear suspension system. The suspension system comprises a pair of inclined primary suspension numbers and a pair of inclined primary oscillating arms pivotally connected to a pair of longitudinal slide rails. U.S. Pat. No. 5,860,486 describes one central suspension arm. Shock absorbers provide for a second attachment between the slide rails and the chassis. Specifically, because of this design, the slide rails do not extend all the way to the forward drive axle, thus creating a space where the track fails to contact the slide rails, which adversely effects snowmobile performance in soft snow.

U.S. Pat. No. 5,033,572, incorporated herein by reference, describes a suspension system having a pair of slide rails, which incorporate two angles of attack. One of the angles of attack favors trail riding while the other provides necessary traction in deeper snow.

U.S. Pat. No. 5,904,216, incorporated herein by reference, describes a suspension system that provides a compact assembly and yet permits the use of a single cushioning unit that extends horizontally within the frame to provide large suspension travel in a relatively small area.

While these designs offer certain advantages, they also suffer from certain drawbacks, which result from reliance on the traditional slide rail as the primary element of the suspension. One specific drawback of conventional slide rails system is the need of front and rear suspension arms that attach the slide rails to the chassis. The need of two suspension arms renders the conventional suspension systems heavy and bulky. A second drawback is the unsupported front portion of the track between the front drive axle and the forward end of the slide rails. This unsupported portion of the track tends to cave inwards due to the pressure of the snow thus creating a lump of snow which the slide rails must travel over or push through, preventing the track from riding on the top surface of the snow.

SUMMARY OF THE INVENTION

There is a need for a new and improved slide rails system that offers an improved construction to avoid, or at least lessen, the effect of the drawbacks described above.

It is an object of the present invention to provide a new slide rail system with improved characteristics that will help decrease the weight and cost of the entire suspension system, provide greater support for the track, and create an improved angle of attack for the track.

It is another object of the present invention to provide a slide rail system, which includes a pair of parallel elongated front slide rails attached together with a series of transverse bars pivotally attached to a second pair of parallel rear slide rails attached together with a series of transverse bars. The forward end portions on the front slide rails are pivotally attached to the chassis of a snowmobile near the front drive sprocket thereby providing support for the entire portion of the track engaging with the terrain over which the vehicle is driven.

Still another object of the present invention is to provide a slide rail system where the front slide rails are attached to the chassis through a linkage member.

Still another object of the present invention is to provide a slide rail system where the front slide rails are directly attached to the front drive axle of a snowmobile.

Another object of the present invention is to provide a slide rail system where the ratio between the length of the front slide rails and the rear slide rails is between 50% and 100%.

Yet another object of the present invention is to provide a slide rail system where the pivot point between the front and rear slide rails is situated a predetermined distance from the drive axle of the snowmobile.

It is still another object of the present invention to provide a slide rail system where the pivot point between the front slide rails and the chassis is a predetermined distance from the front drive axle of the snowmobile.

It is yet another object of the present invention to provide a suspension system where the slide rails include a pair of front and rear slide rails. The front and rear slide rails are pivotally connected to one another. The front slide rails are also adapted to be pivotally connected to the chassis near the front drive axle. The suspension system includes at least one suspension arm attaching one of the rear slide rails and the front slide rails to the chassis and one shock assembly attaching one of the front slide rails and the rear slide rails to the chassis of the snowmobile.

According to another aspect of the present invention, a snowmobile is provided that includes a chassis. An engine is disposed on the chassis. A steering column is attached to at least one ski for steering the snowmobile over the snow. An endless track is disposed under the chassis and is operatively connected to the engine for propelling the snowmobile. The snowmobile includes a slide rail system, which includes a pair of parallel elongated front slide rails attached together with at least one transverse bar pivotally attached to a second pair of parallel rear slide rails also attached together with transverse bars. The front-end portions of the front slide rails are pivotally attached to one of the chassis of a snowmobile near the front drive axle or directly to the front drive axle.

Another object of the present invention is to provide a snowmobile with a suspension system that includes a pair of front and rear slide rails which pivot with respect to one another. The suspension system includes at least one suspension arm attaching one of the front slide rails and the rear slide rails to the chassis and one shock assembly attaching one of the front slide rails and the rear slide rails to the chassis of the snowmobile.

Yet another object of the present invention is to provide the slide rail system with a mechanism that will prevent the rotation of the rear suspension arm such that the weight transfer of the vehicle will be controllable.

Still another object of the present invention is to provide a snowmobile with a suspension system in which the ratio of the length of the endless track to the length of the rear slide rails is a predetermined number.

It is still another object of the present invention to provide a snowmobile with a suspension system in which the ratio of the length of the endless track to the length of the front slide rails is a predetermined number.

The foregoing objects are not meant to limit the scope of the present invention. To the contrary, still other objects of the present invention will become apparent from the description that follows.

BRIEF DESCRIPTION OF THE DRAWINGS

Reference will be made hereinafter to the accompanying drawings, which illustrate embodiments of the present invention discussed herein below, wherein.

DETAILED DESCRIPTION OF THE PREFERRED EMBODIMENTS

Figure 1:
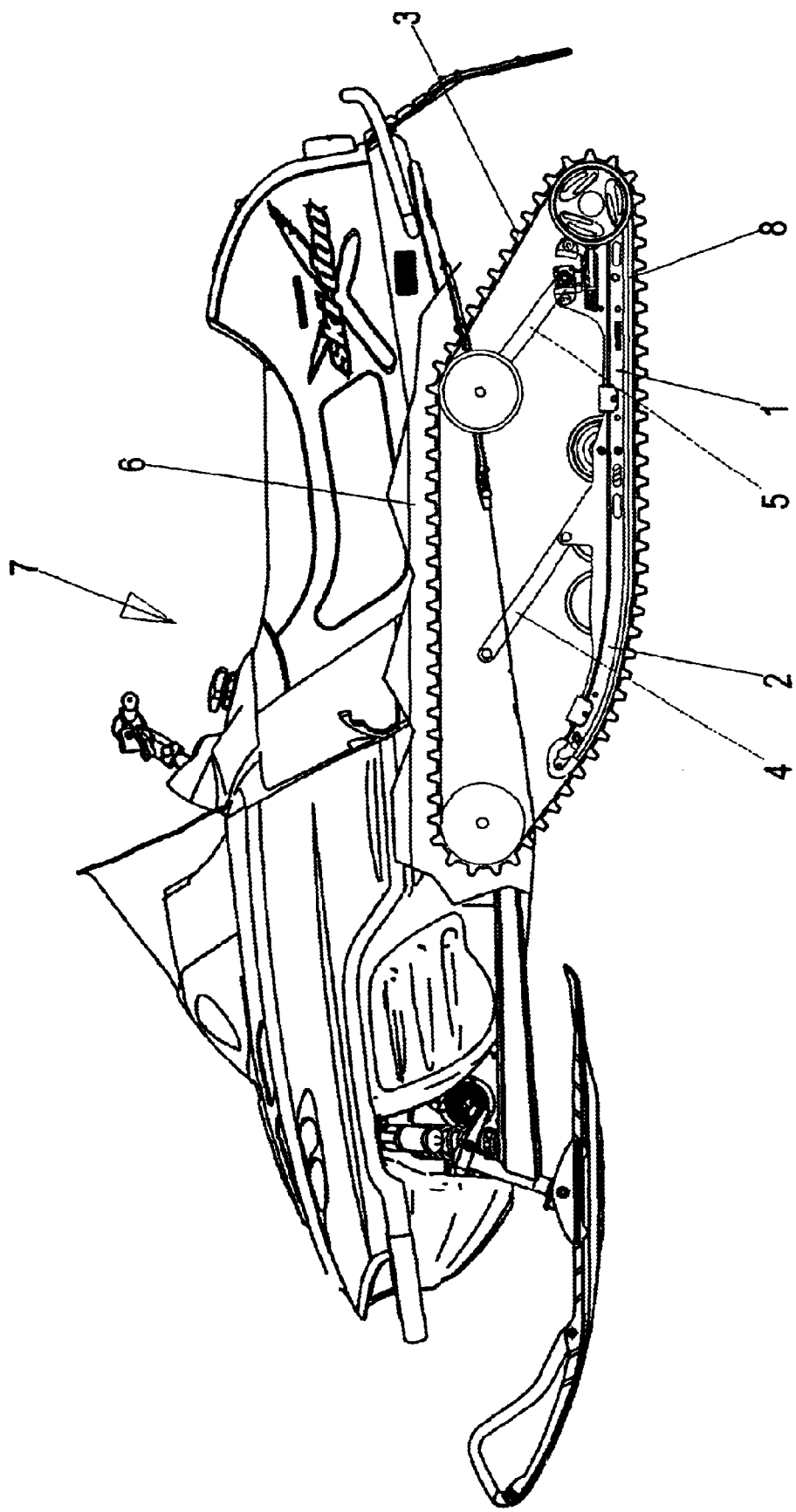
FIG. 1 is a side elevation view of the prior art snowmobile with the suspension system shown in solid lines.
Figure 2:
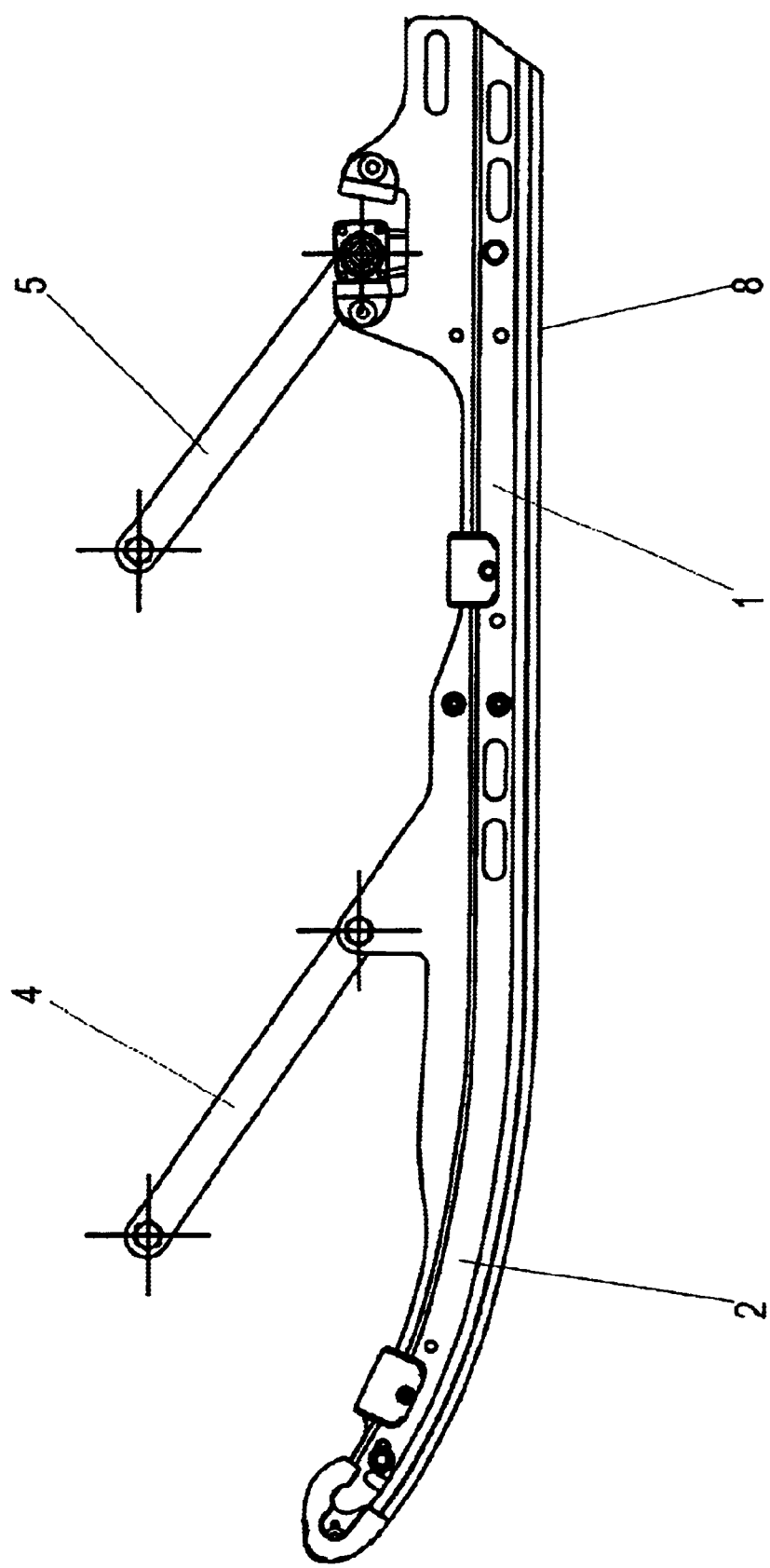
FIG. 2 is a side elevation view of a prior art slide rail system shown in FIG. 1.

A slide rail system 10 according to the present invention is shown in FIGS. 3–17. The slide rail system 10 shown in FIG. 3 has rear slides rails 12 and front slide rails 14. The front slide rails 14 are pivotally attached to rear slide rails 12 at a pivot point 26.

Rear slide rails 12 include a right slide rail 16 and a left slide rail 18. Front slide rails 14 have a right slide rail 20 and a left slide rail 22. (The "right" and "left" sides are defined with reference to the forward travel direction of the snowmobile).

Figure 3:
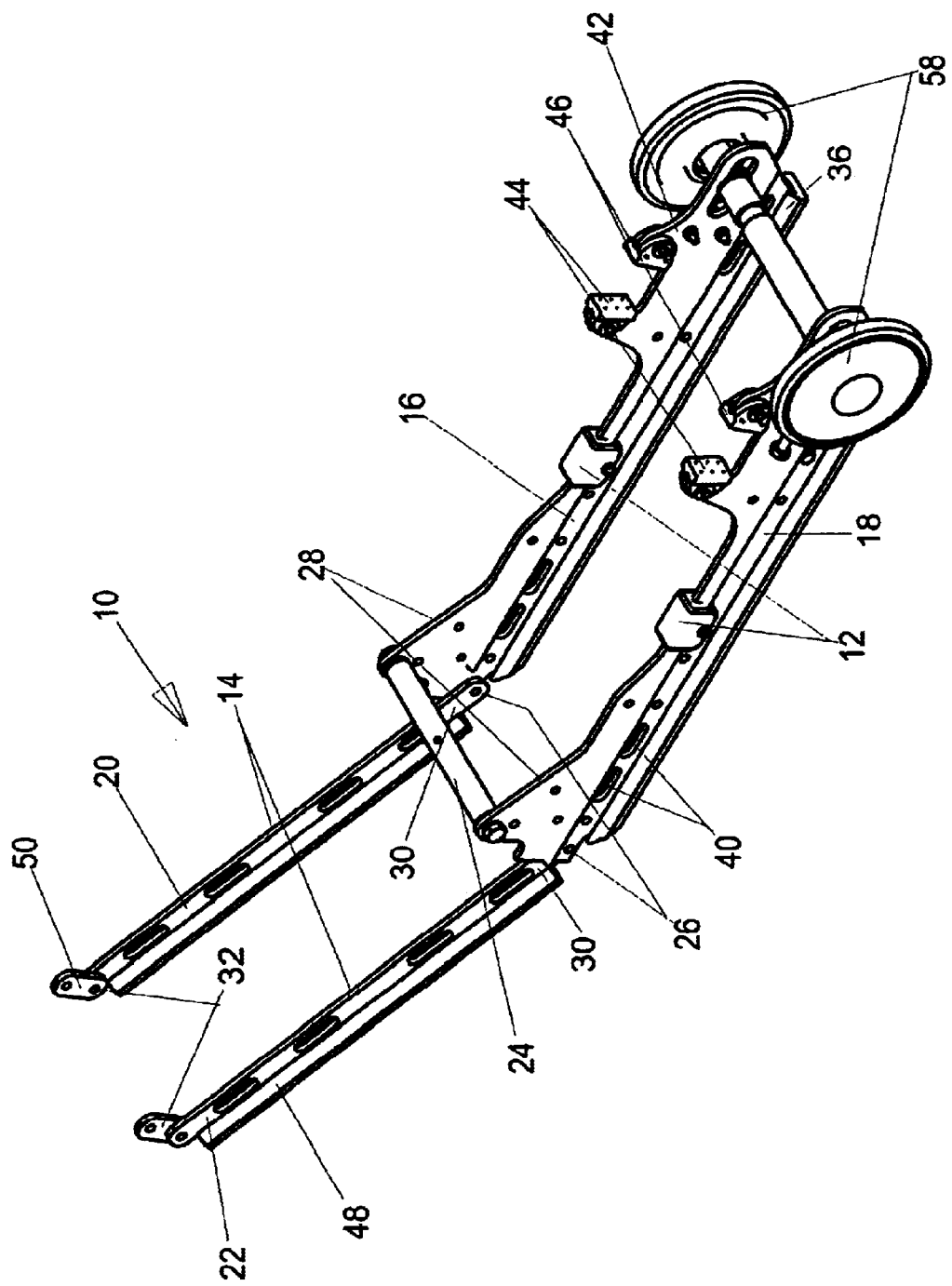
FIG. 3 is a left rear perspective view of a first embodiment of the slide rail system according to the present invention.

As shown in FIG. 3, the rear slide rails 12 have a forward end 28, which is pivotally attached to the rear end 30 of the front slide rails 14. The front slide rails 14 also have a forward end 32, which is pivotally attached to the chassis 34 by linkages 50.

Front and rear slide rails 12, 14 are preferably made from aluminum, but other suitable materials may be used. As shown in FIG. 3, the rear slide rails 12 have a flat bottom portion 36 to slide along the endless track 38 shown in FIG. 12, for example. Conventionally, the flat bottom portion 36 is covered with a nylon slide, (not shown) to decrease the friction between the rear slide rails 12 and the endless track 38. The rear slide rails 12 also include several apertures 40 to make the rear slide rails 12 lighter in weight.

Rear slide rails 12 may also include extensions 42 where front stoppers 44 and rear stoppers 46 are preferably mounted. While not required to practice the present invention, extensions 42 provide a platform for the front stopper 44 and rear stopper 46. Front and rear stoppers 44 and 46 define the extremes between which a coupled suspension operates.

The front slide rails 14, also shown in FIG. 3, are preferably made from aluminum. Just as with rear slide rails 12, front slide rails 14 may include several apertures 40 to lighten the weight thereof. Front slide rails 14 have a flat bottom portion 48 which is normally covered by a nylon slide (not shown) to reduce the friction between the front slide rails 14 and the endless track 38 shown in FIG. 12.

Figure 4:
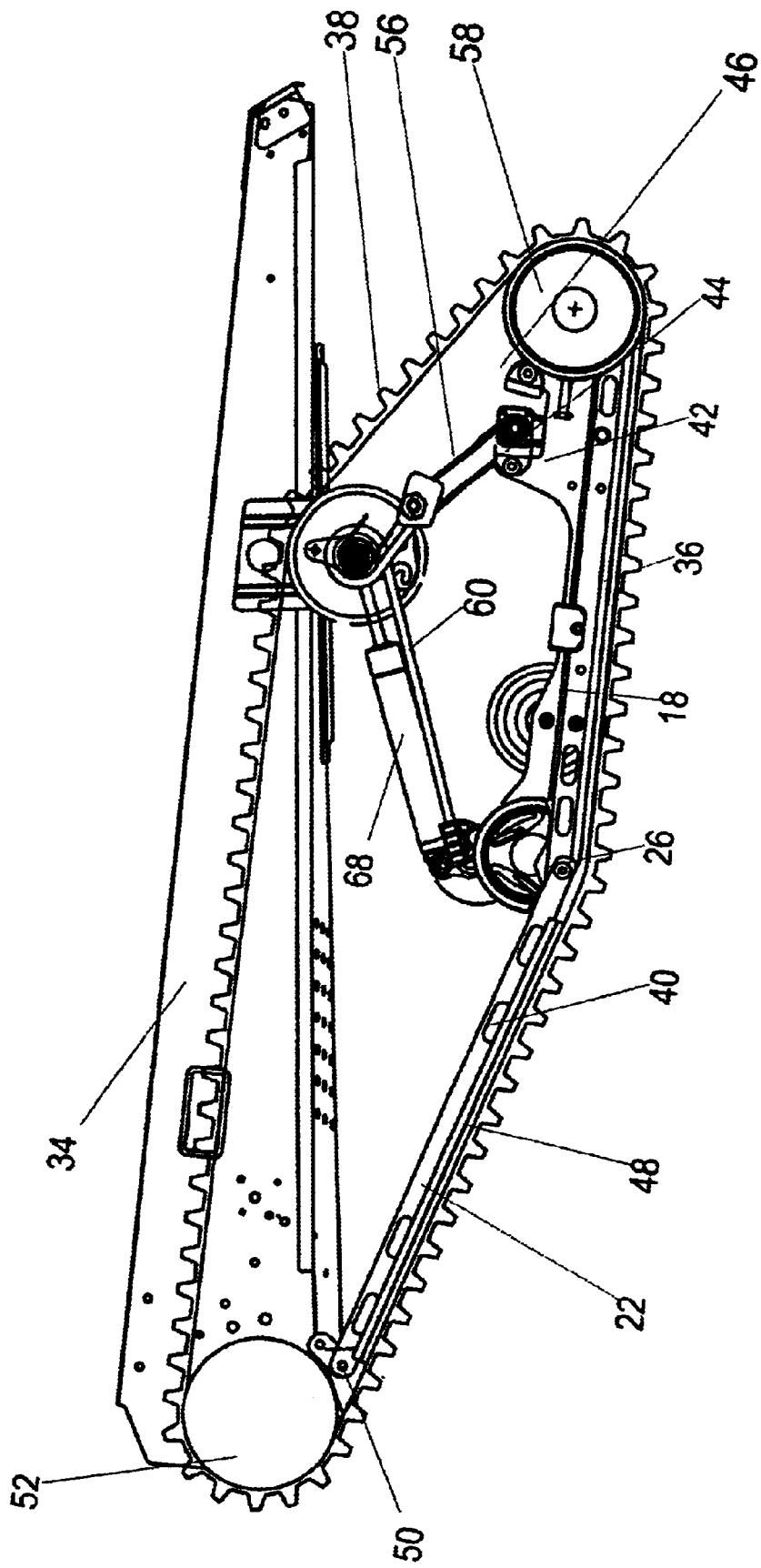
FIG. 4 is a left side view of the first embodiment of the suspension system of the present invention.
Figure 5:
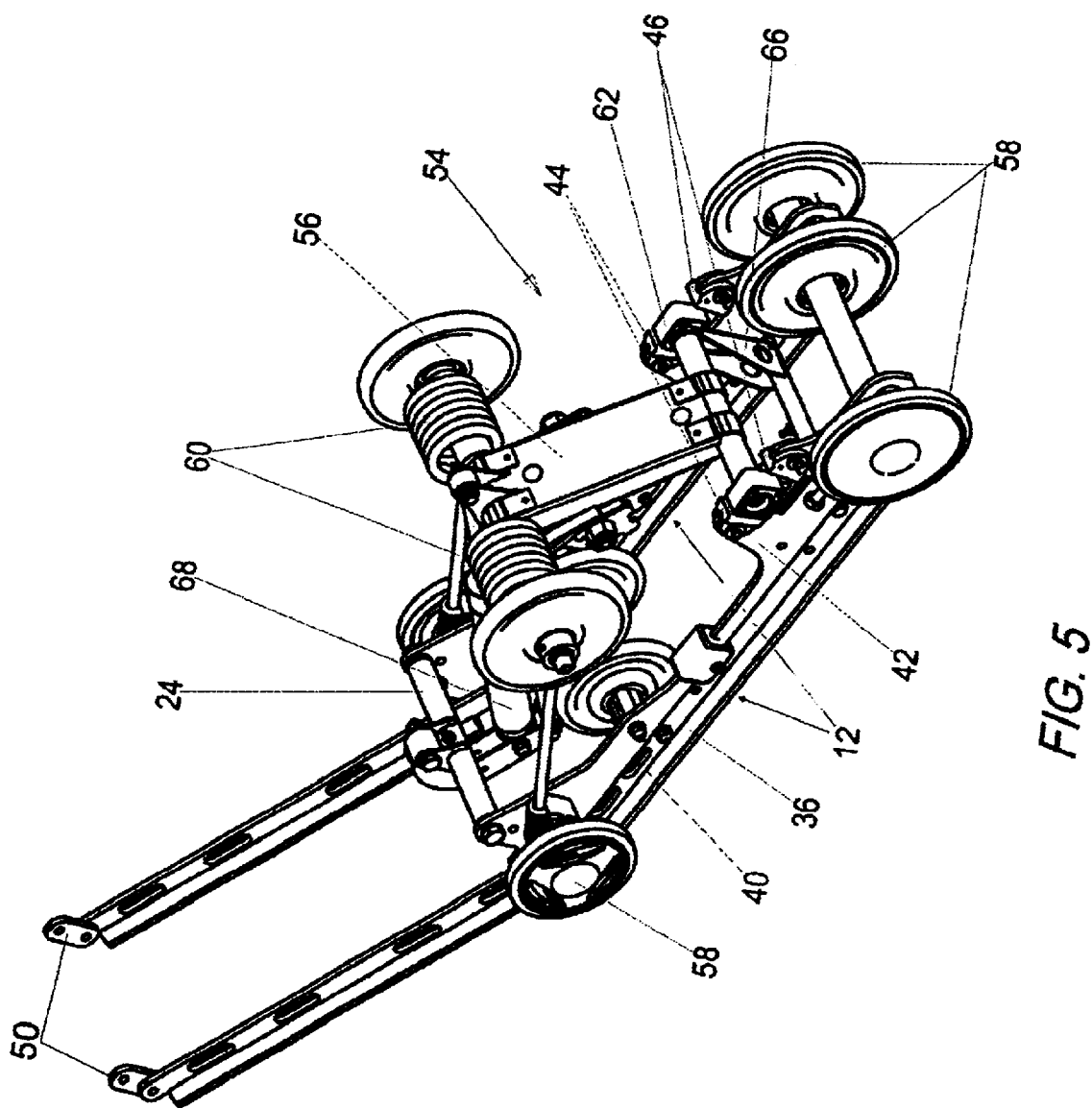
FIG. 5 is a perspective view of a prior art rear suspension system supported by the slide rail system of the present invention.
Figure 6:
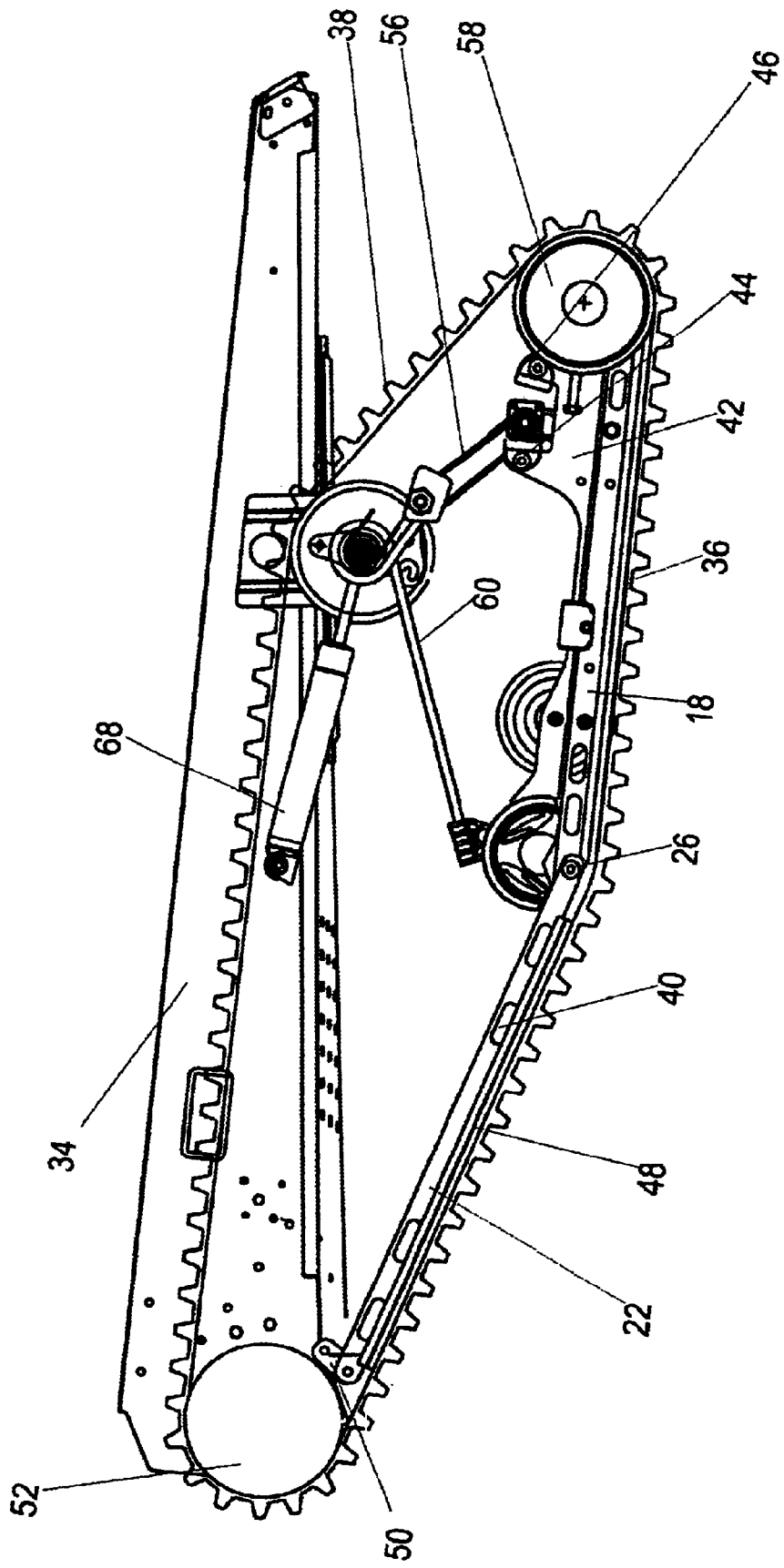
FIG. 6 is a left side view of a prior art rear suspension system supported by the slide rail system of the present invention.

As illustrated in FIG. 4, the front slide rails 14 are pivotally attached to the chassis 34 through a linkage 50. The linkage 50 is attached to the chassis 34 near or at the front drive axle 52 shown in FIG. 4. As illustrated, the linkages 50 are elongated plate-like members that pivotally connect between the chassis 34 and the front slide rails 14. Preferably, linkages 50 are fabricated from aluminum because of its low weight. However, any suitable material may be used.

Figure 7:
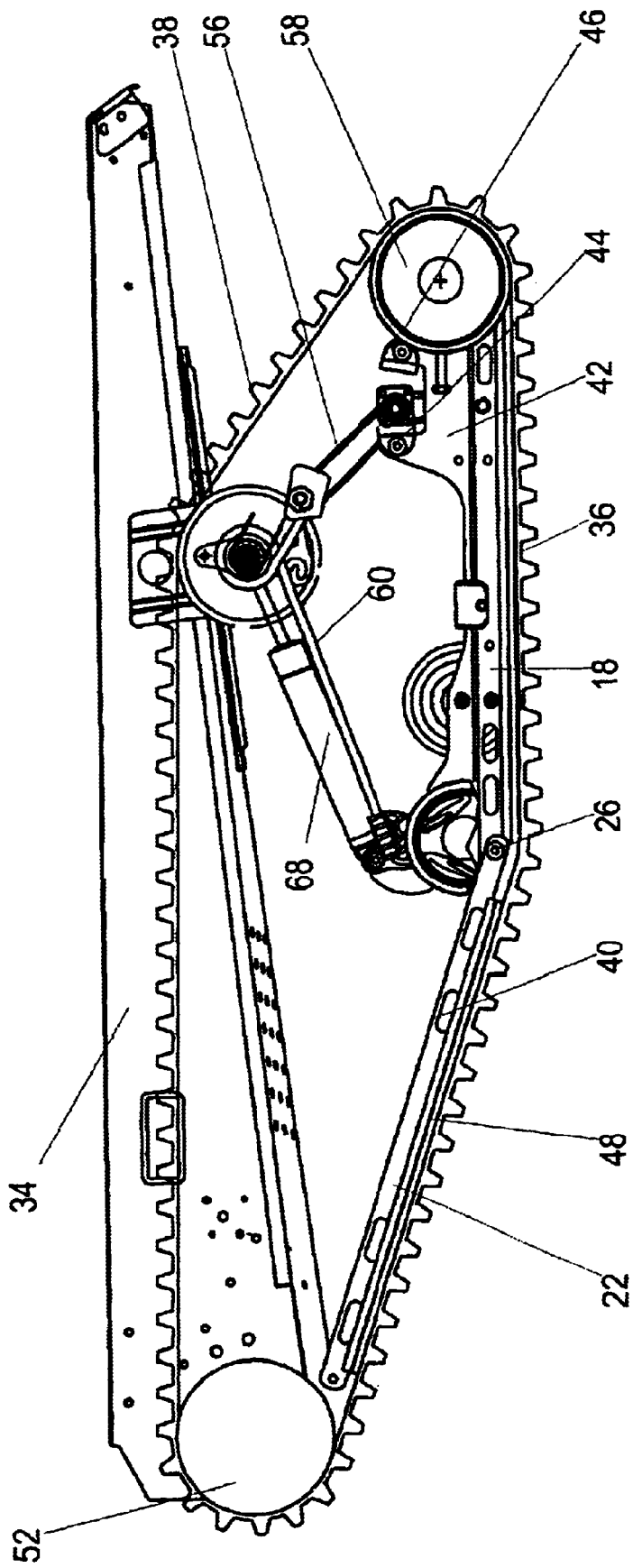
FIG. 7 is a left side view of a second embodiment of the slide rail system of the present invention supporting a prior art cushioning unit.

In the preferred embodiment illustrated in FIG. 7, the front slide rails 14 are pivotally attached directly to the chassis 34 without linkages 50.

Figure 13:
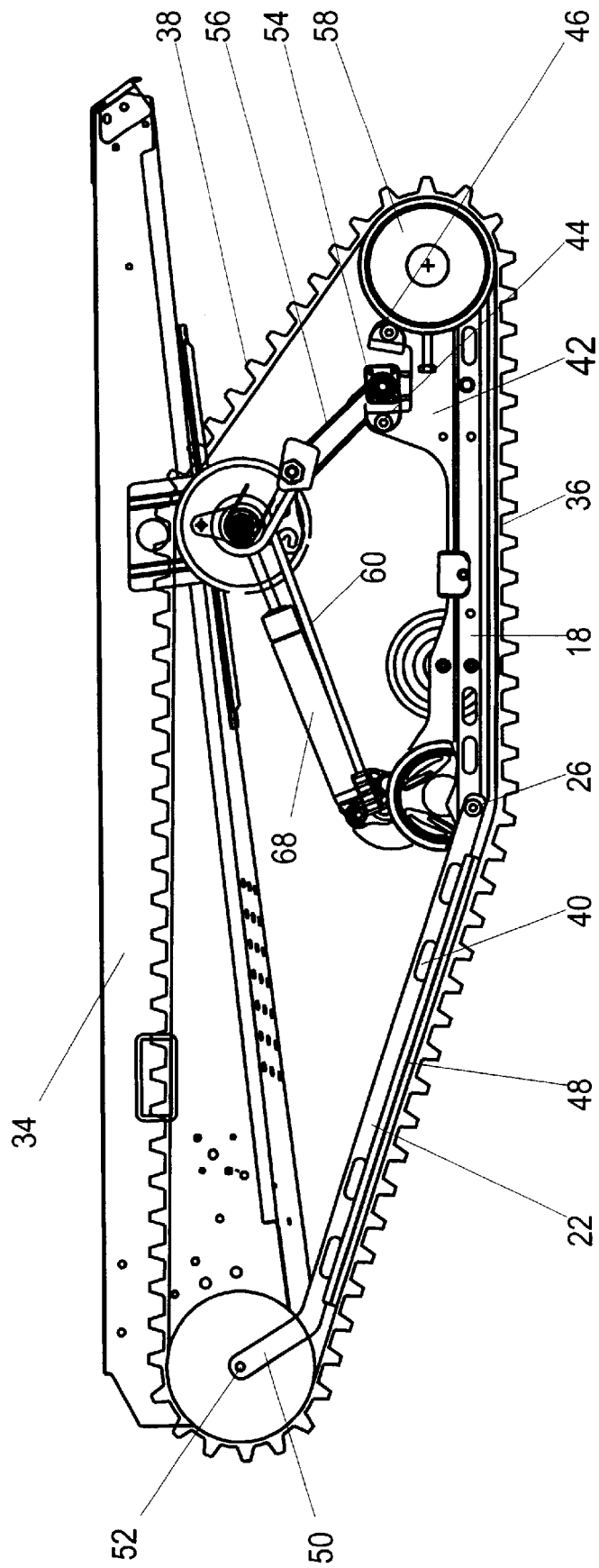
FIG. 13 is a left side view of a third embodiment of the slide rail system of the present invention supporting a prior art cushioning unit.

A third embodiment, illustrated in FIG. 13 shows the front rails 14 connected to the chassis 34 via the front drive axle

Figure 14:
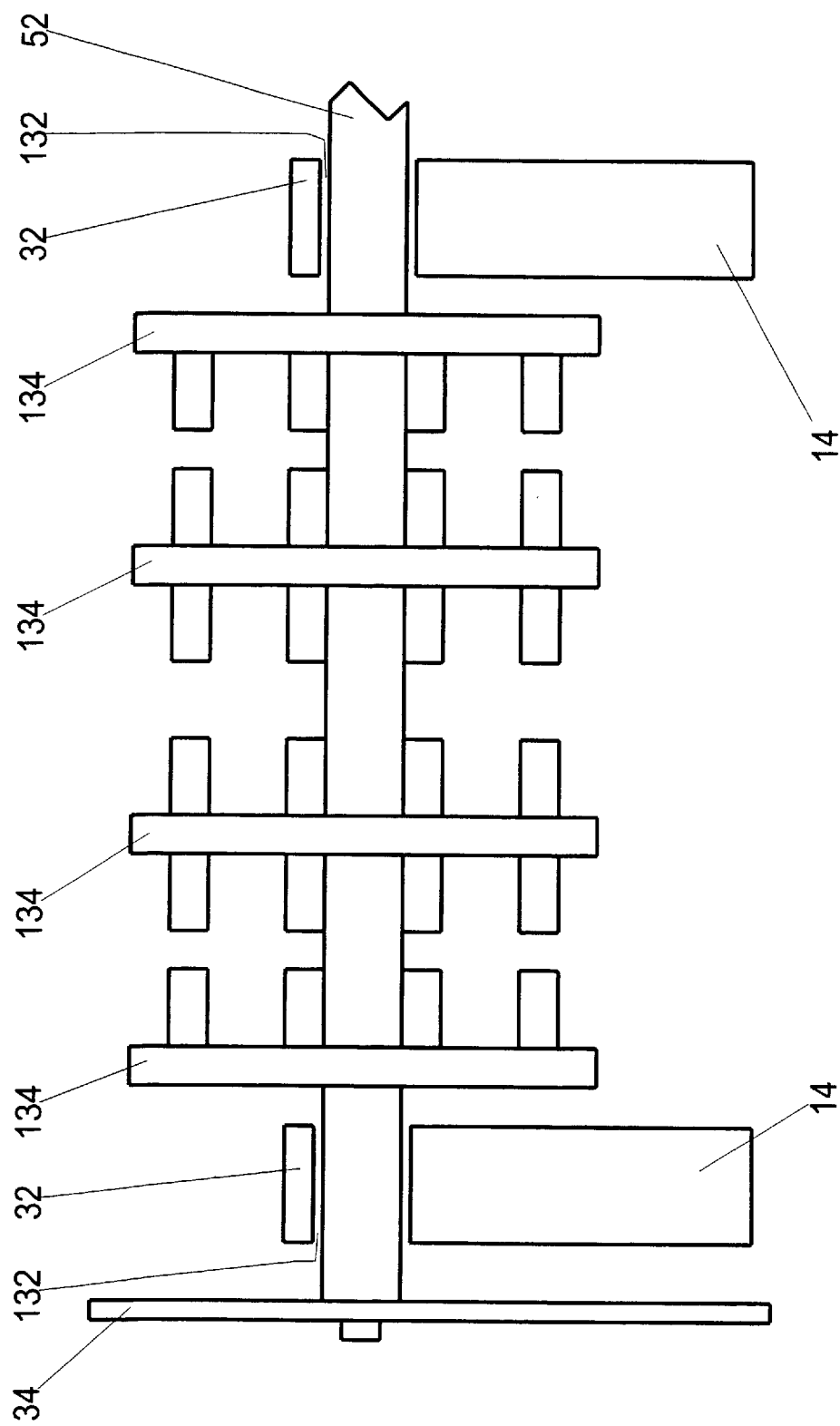
FIG. 14 is a top cross-section of a pivot connection between the front slide rails and the front drive axle.

52. FIG. 13 shows linkage 50 connecting the front slide rail 14 to the front drive axle 52, but front rails 14 could be directly connected to the front drive axle 52 via its front end 32 as indicated in FIG. 14.

Figure 8:
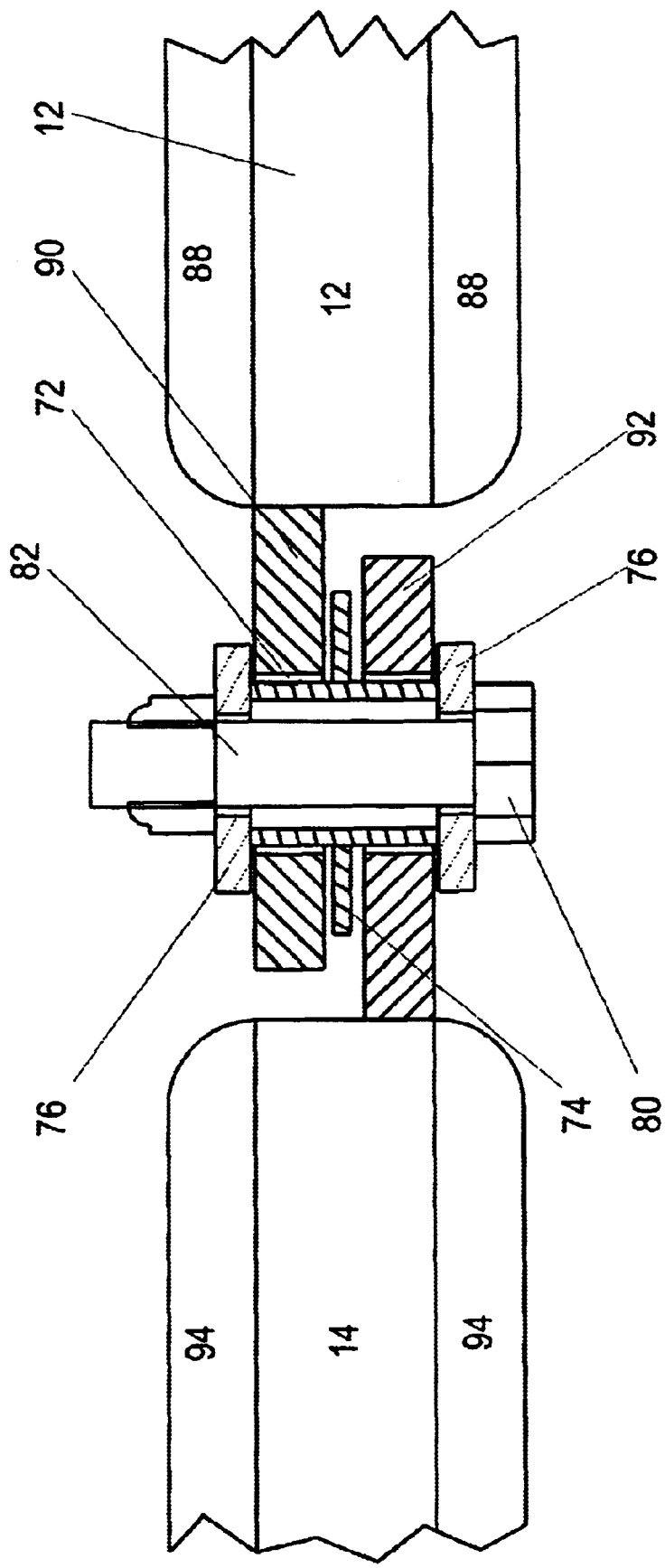
FIG. 8 is a top cross-section of a first pivot connection between the front and rear slide rails.
Figure 9:
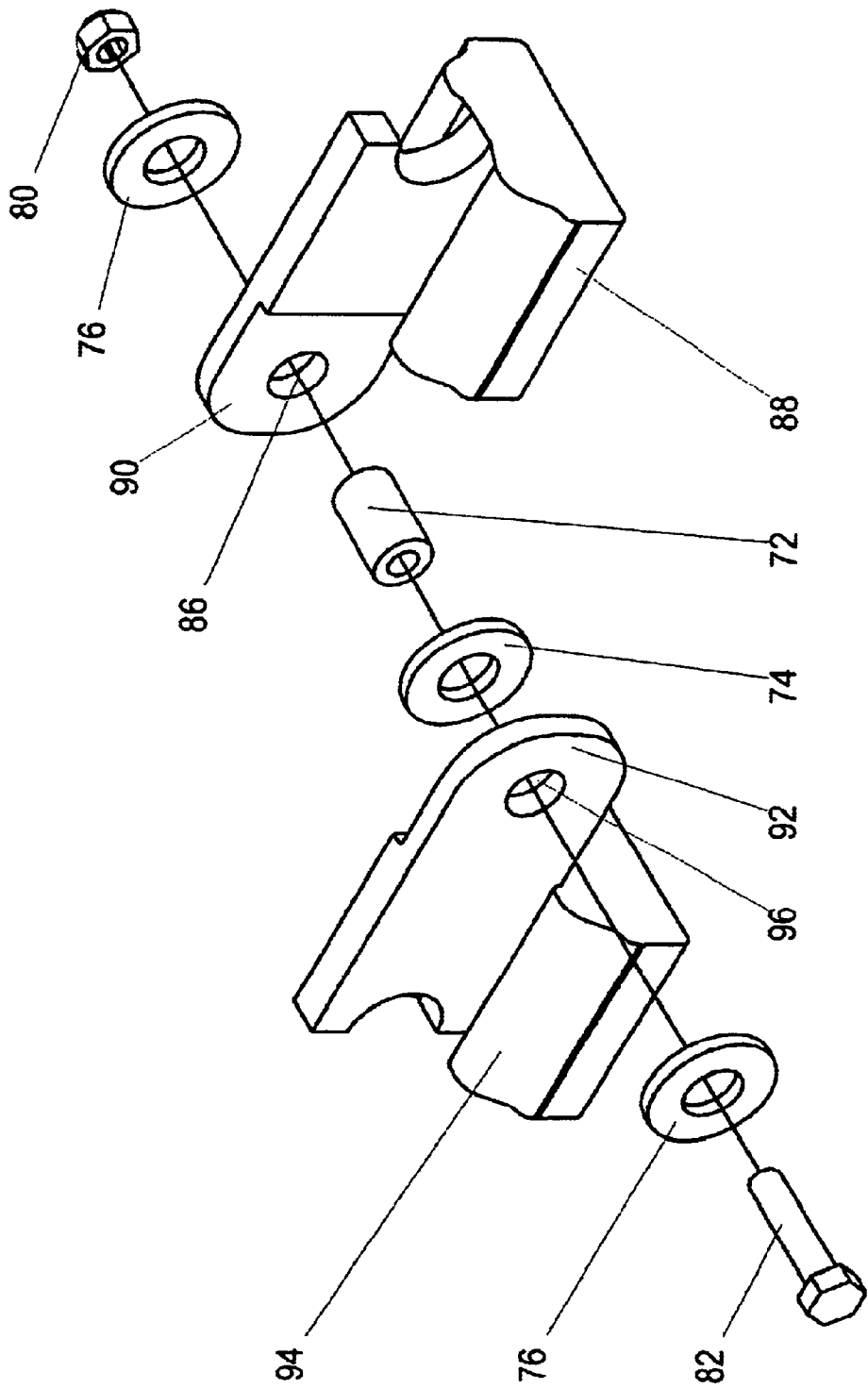
FIG. 9 is a partially exploded perspective view of the pivot connection between the front and rear slide rails shown in FIG. 8.

One type of pivot point 26, shown in further detail in FIGS. 8 and 9, is a bushing-type pivot, but other methods of attachment are available. The pivot point 26 comprises a bushing 72, a spacer 74, and several washers 76 all held together with a nut 80 and bolt 82. The forward end 28 of the rear slide rails 12 includes an extended portion 90, which has a hole 86 passing therethrough. The extended portion 90 contacts the surface of the spacer 74 which in turn contacts the surface of an extended portion 92 of the associated front slide rail 14. Extended portion 92 also has a hole 96 passing therethrough. As depicted in FIG. 9, flanges 88 extend from the flat bottom portion 36 of the rear slide rails 12. Similar flanges 94 extend from the flat bottom portion 48 of the front slide rails 14. Preferably these components are made from aluminum or plastic, but other materials may be suitable therefor.

Figure 10:
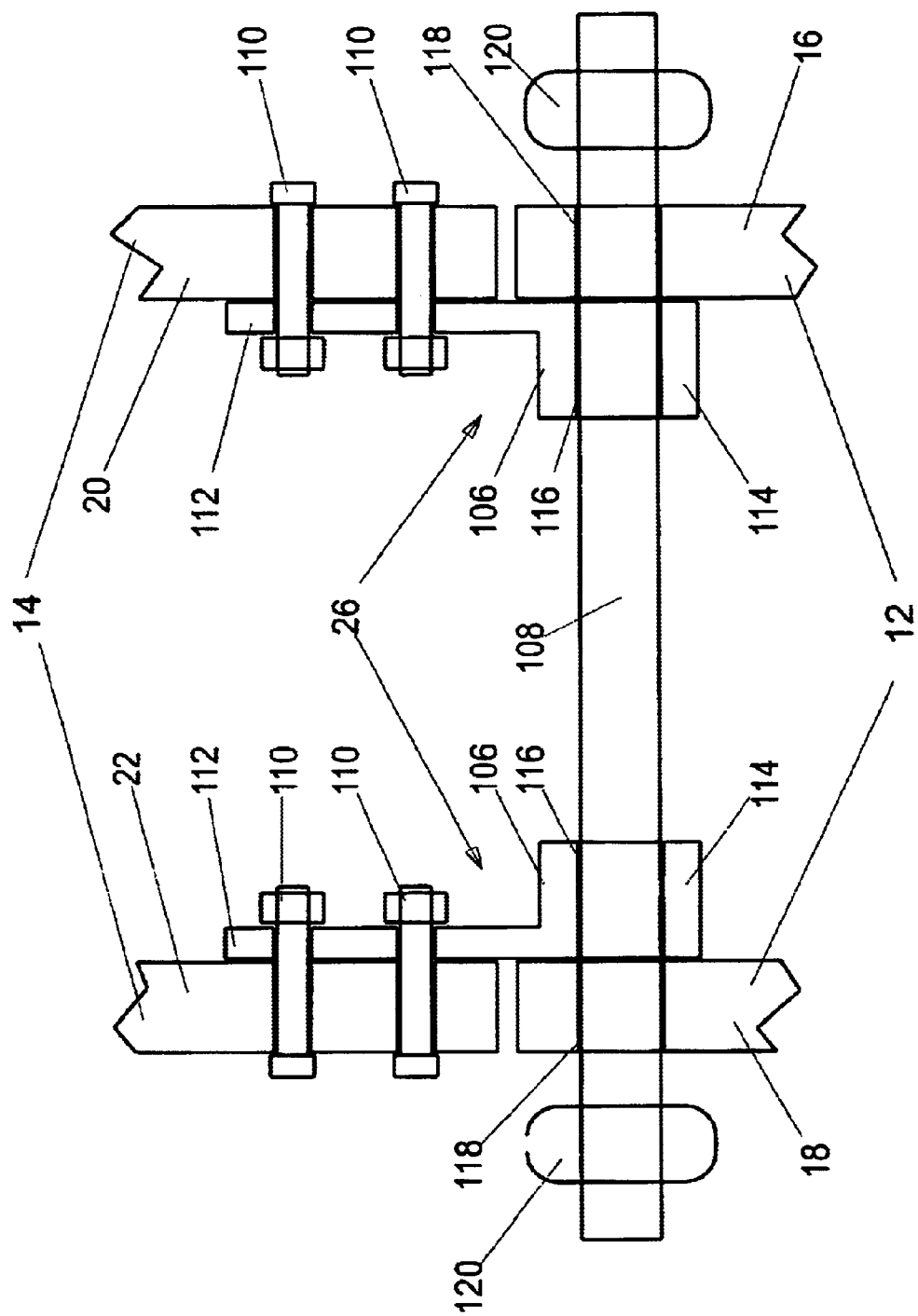
FIG. 10 is an alternate pivot connection between the front and rear slide rails.

A second and preferable type of pivot connection between the front slide rails 14 and the rear slide rails 12 is shown in detail in FIG. 10. FIG. 10 shows each pair of slide rails 12 and 14 connected with a pivot plate 106. Pivot plate 106 has a first end 112 and a second end 114. Preferably, pivot plate 106 is attached to the front slide rails 14 at the first end 112 by two fasteners 110 to prevent any relative movement therebetween. Fasteners 110 can be for example, nut and bolt type fasteners, rivets or any suitable attachment means which will withstand the shocks transferred from the rough terrain which a snowmobile encounters. The second end 114 of the pivot plate 106 is rotatably connected to a shaft 108. Pivot plate 106 has passing through the second end 114 a hole 116 through which shaft 108 passes. Preferably, hole 116 contains a ball bearing or journal bearing to reduce the friction between the pivot plate 106 and the shaft 108.

The forward end 28 of the rear slide rails 12 also have passing therethrough a hole 118 to accept shaft 108. As with hole 116, hole 118 may be fitted with friction reducers such as ball bearings. As shown in FIG. 10, shaft 108 extends from the left slide rail 18 across to right slide rail 16. Shaft 108 helps to increase the rigidity of the slide rail system as well as providing a rotational support for idler wheels 120. Although the preferred embodiment has the pivot plate 106 fixedly attached to the front slide rails and pivotally attached to the rear slides via shaft 108, it is possible to invert the connection and fix the pivot plate 106 with the rear slide rails 12 and pivotally connect the pivot plate 106 with the front slide rails 14 via the shaft 108.

Figure 11:
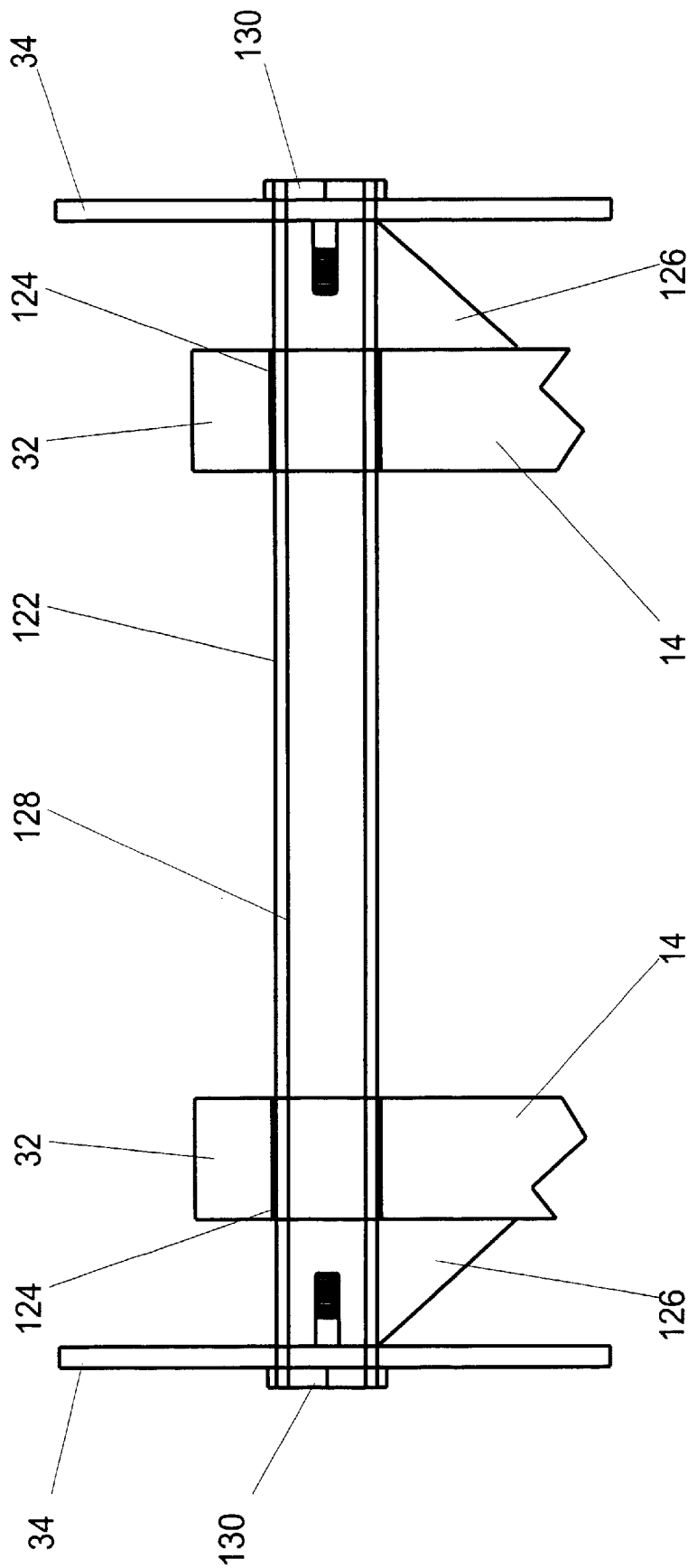
FIG. 11 is top cross-section of a pivot connection between the front slide rails and the chassis.

FIG. 11 shows a pivot connection between front slide rails 14 and the chassis 34. The forward portions 32 of the front slide rails 14 each have a hole 124 passing therethrough to accept a tube 122. Tube 122 extends laterally between the two sides of the chassis 34. Tube 122 is connected to the front slide rails 14 by a triangular flange 126 that is fixedly connected to the tube preferably by fasteners or welding. Triangular flange 126 is also connected to the front slide rails 14 to prevent relative movement between the front slide rails 14 and the tube 122. A rod 128 passes through tube 122 such that rod 128 can rotate within the tube 122. The rod 128 is attached to the chassis 34, preferably by bolts 130, to prevent relative movement between the chassis 34 and the rod 128. It would be recognized that the length of rod 128 to be slightly longer than tube 122 to allow rotation of tube 122 about rod 128 when bolts 130 secure rod 128 to the chassis 34. The rod 128 may carry friction reducers such as ball bearings or journal bearings. Tube 122 may also carry a mechanism that introduces lubrication between the contacting surfaces of tube 122 and rod 128.

FIG. 14 shows a pivot connection between the front slide rails 14 and the front drive axle 52. In the connection shown in FIG. 14, the forward portion 32 of the front slide rails 14 have holes 132 passing therethrough to accept the front drive axle 52. Preferably, hole 132 would be fitted with friction reducers such as ball bearings or journal bearings. Also shown in FIG. 14 are sprockets 134 attached to the drive axle 52. Sprockets 134 are used to transfer rotational movement of the drive axle 52 to rotational movement of the endless track 38.

Figure 15:
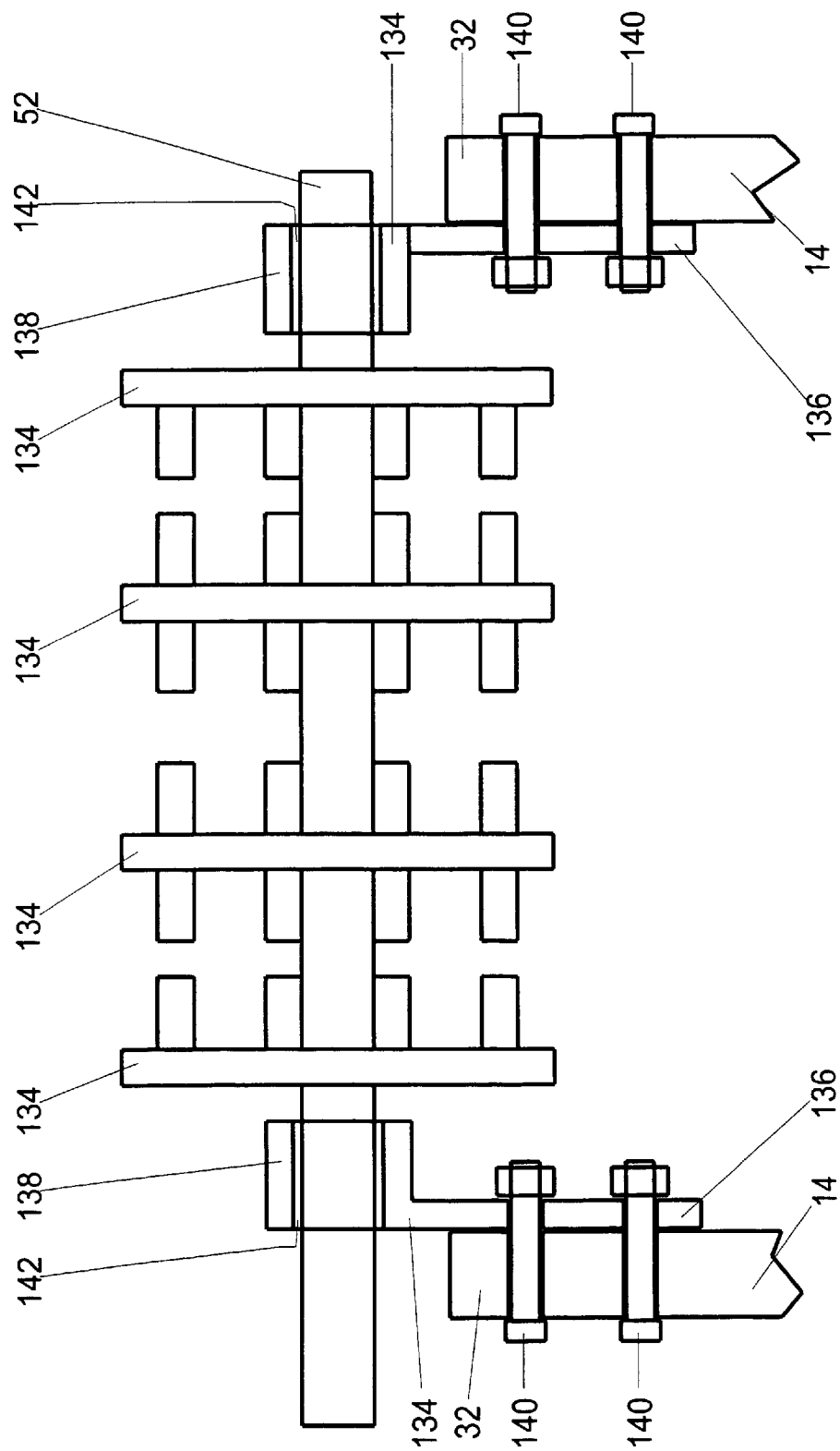
FIG. 15 is a top view of an alternate pivot connection between the front slide rails and the front drive axle.

FIG. 15 shows an alternate connection between the front slide rails 14 and the front drive axle 52. Attached to the forward portion 32 of the front slide rails 14 is a pivot plate 135 similar to pivot plate 106. Pivot plate 135 has a first end 136 and a second end 138. The first end 136 of the pivot plate 135 is attached to the forward portion 32 of the front slide rails 14 using bolts 140, but other methods of attachment are available. The second end 138 of the pivot plate 135 has a hole 142 passing therethrough to accept the front drive axle 52. Preferably, hole 142 is fitted with friction reducers such as ball bearings or journal bearings. Also shown in FIG. 15 are sprockets 134 attached to the front drive axle 52 to transfer rotational movement of the front drive axle 52 to the endless track 38.

The slide rail system of the present invention will now be described in connection with a rear suspension system that connects the rear slide rails to the chassis of a snowmobile.

Figure 12:
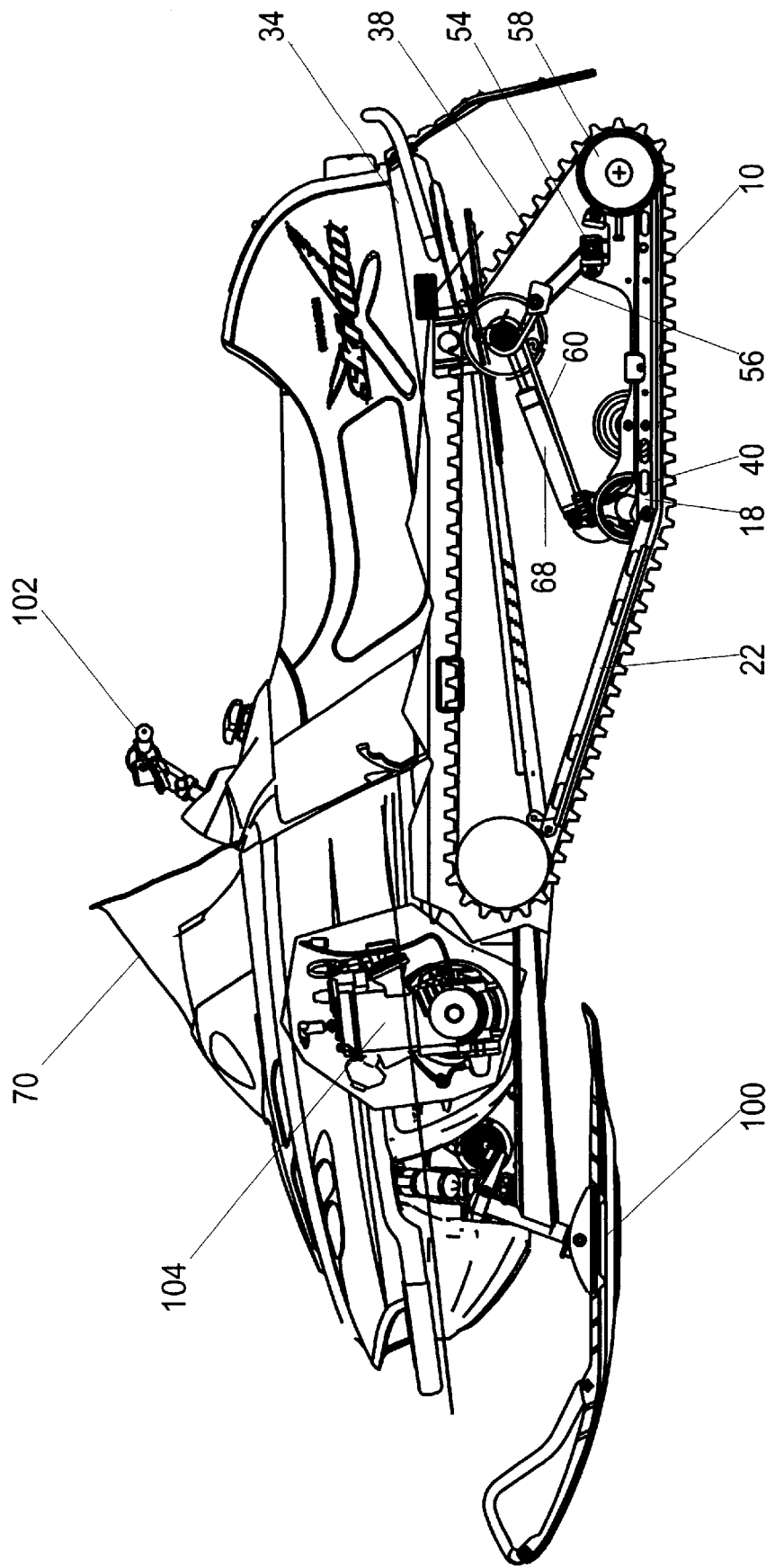
FIG. 12 is left side view of a snowmobile equipped with a slide rail system of the present invention.

Shown in FIG. 12 is an adjustable rear suspension system 54 used for mounting the endless track 38 to the chassis 34 of snowmobile 70. As illustrated in greater detail in FIGS. 4 and 5, the suspension system 54 comprises the front slide rails 14, rear slide rails 12 and a rear suspension arm 56. Also mounted to the rear slide rails 12 is a plurality of wheels 58 for engagement with the endless track 38. At least two torsion spring-like members 60 are connected to the chassis 34 near the rear suspension arm 56 and the rear slide rails 12 to urge the rear slide rails 12 away from the chassis 34 so that the suspension is in a ready position to absorb shocks as the vehicle travels over uneven terrain.

The rear suspension arm 56 has an upper end pivotally connected to the chassis 34 and a lower end pivotally connected to a pair of blocks 62 via a cross bar 64. The cross bar 64 is connected to a rocker arm assembly 66 which is, in turn, pivotally connected to the rear slide rails 12.

A shock absorber 68 has an upper end pivotally connected to the rear suspension arm 56 which is in turn connected to the chassis 34 and a lower end pivotally connected the rear slide rails 12 through a transverse rod 24 or other conventional pivot means attached to slide rails 12. A secondary compression spring (not shown) can be added over the shock absorber 68 to enhance the shock absorbing characteristics of the suspension system.

While the slide rails system 10 of the present invention are shown to support the suspension system of the MX Z ™ Ski-Doos by Bombardier Inc of Montreal Quebec, Canada (2001 model year), the present invention could be supported by other suspension systems and is not limited thereby. For example, the suspension system described in U.S. Pat. No. 5,904,216 could be substituted for the suspension 54 illustrated in FIGS. 4 and 5. Another example of a rear suspension system that could be supported by the slide rail system 10 of the present invention is described in U.S. Pat. No. 5,265,692, incorporated herein by reference.

Referring to FIG. 12, the slide rail system 10 may be used on any suitable vehicle, including a snowmobile 70. Snowmobile 70 has a chassis 34 on which an engine 104 is disposed. Chassis 34 has an inverted U-shaped cross section through which an endless track 38 rotates. A pair of skis 100 is attached to the front portion of the chassis 34 and is connected to a steering device 102 to steer the snowmobile 70. The endless track 38, connected to the engine 104, is placed under the chassis 34 to propel the snowmobile 70. The snowmobile 70 includes the slide rail system 10 described above.

Figure 16:
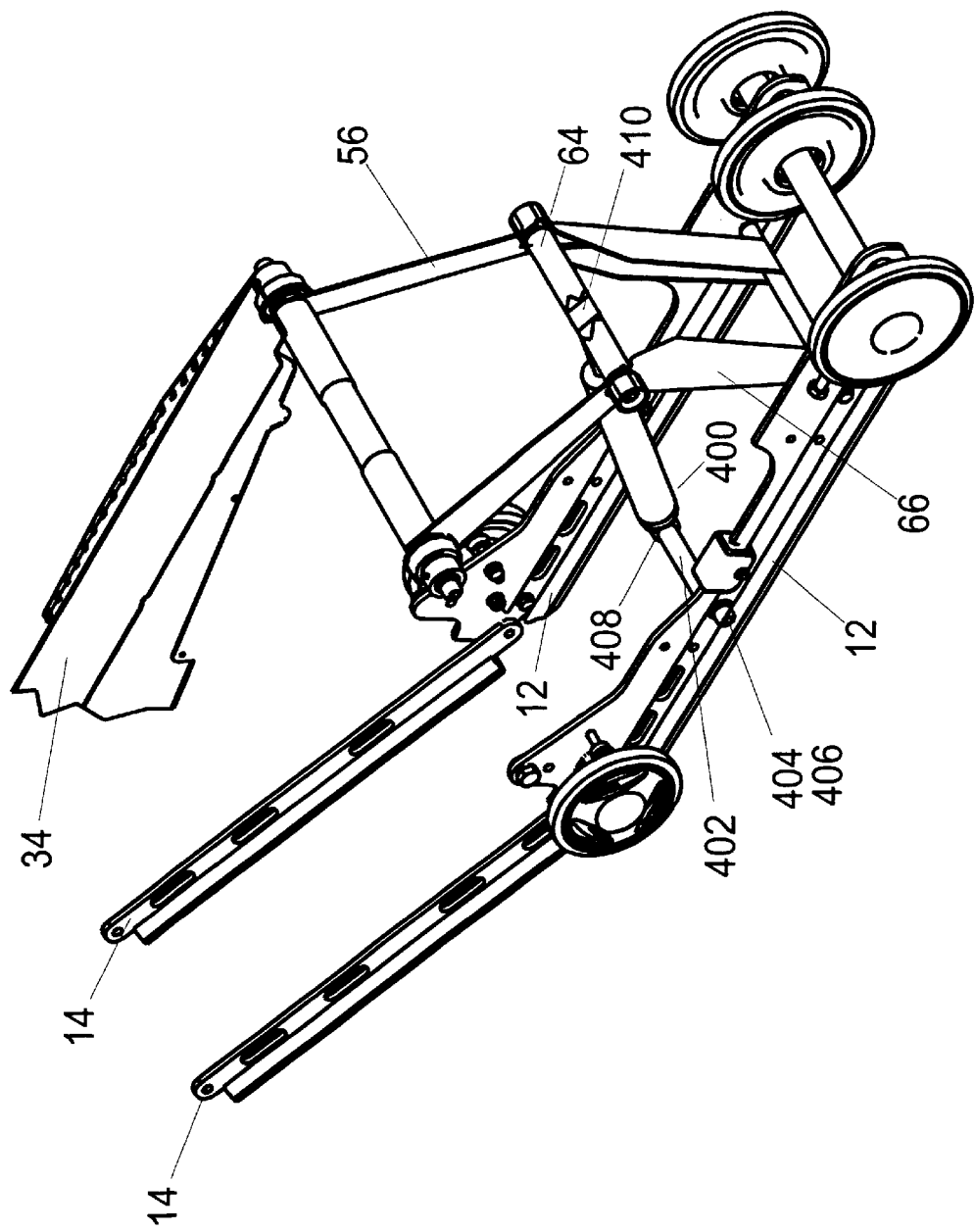
FIG. 16 is a perspective view of a fourth embodiment of the slide rail system of the present invention.

FIG. 16 illustrates a mechanism 400 that prevents the free rotation of the rocker arm assembly 66. Mechanism 400 could be a conventional shock absorber for example or a specific type of cylinder that would create resistance to clockwise and counterclockwise rotation of the rocker arm assembly 66. Shown in FIG. 16, mechanism 400 is attached to the rear slide rails 12 via a bar 402 which is fixedly attached to each rear slide rail 12 at points 404 and 406. The attachment point 408 between the mechanism 400 and the bar 402 is preferably a rotating attachment point in order to permit the mechanism 400 to rotate about the rear slide rails 12 when the suspension system is compressed. A second end 410 of the mechanism 400 is attached to the cross bar 64 connecting the arms of the rocker arm assembly 66. The mechanism 400 may be attached directly to the rocker arm assembly 66. The second end 410 of the mechanism 400 is preferably rotatably attached to the cross bar 64 to permit rotation therebetween. Although shown in FIG. 16 in combination with the second embodiment having the front slide rails 14 attached directly to the chassis 34, that mechanism 400 may also be installed with the embodiments shown in FIGS. 3 and 13.

Figure 17:
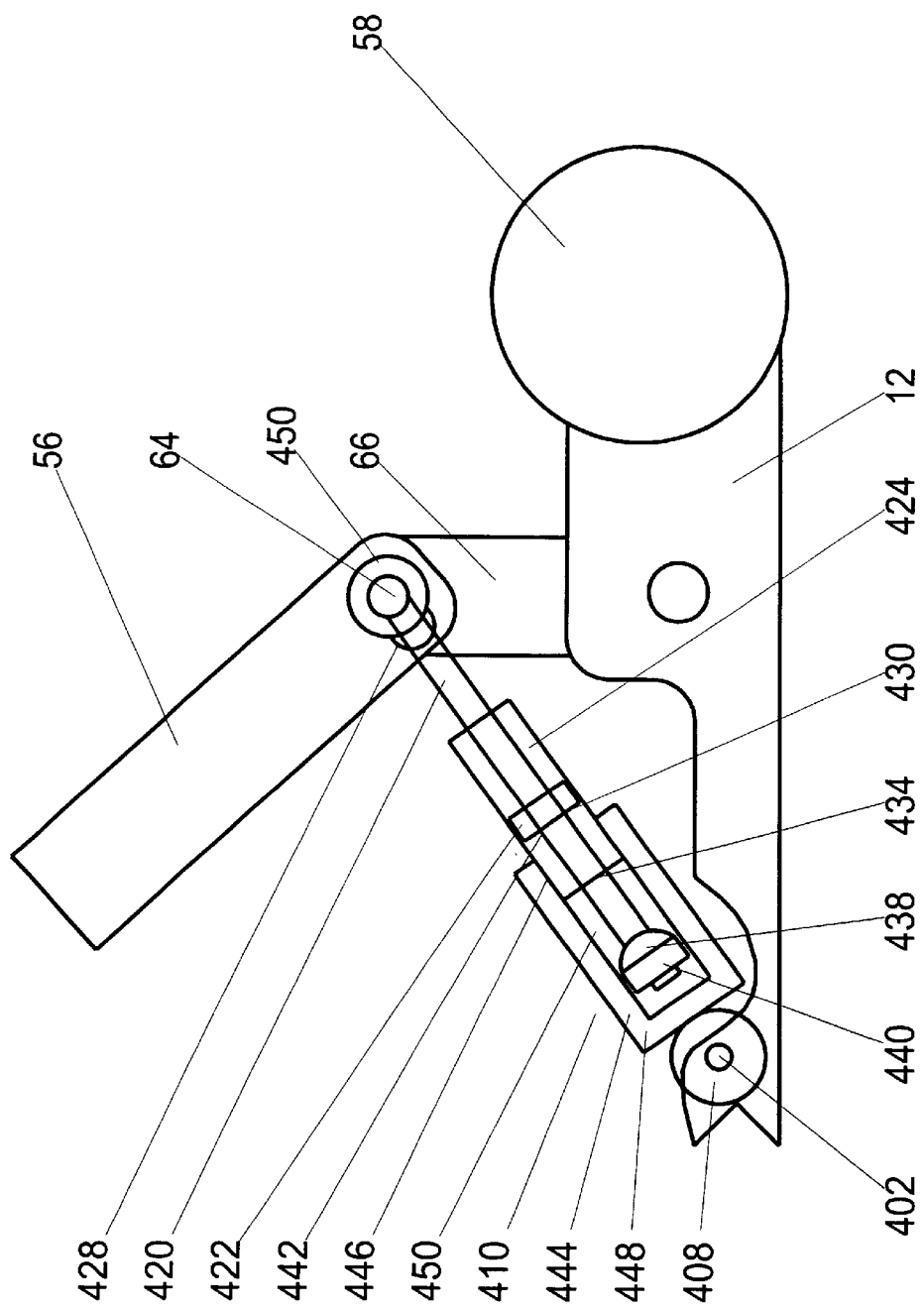
FIG. 17 is a partial side view of the embodiment shown in FIG. 16.

FIG. 17 shows a side view of the preferred embodiment of the mechanism 400. Mechanism 400 includes a rod 420 on which a piston 422 is attached such that there is no relative movement therebetween. Enclosing the piston 422 and a portion of the rod 420 is a body 424. Preferably, body 424 comprises a cylindrical hollow tube with sealed end portions through which the rod 420 passes such that the rod 420 can push and pull the piston 422 within the body 424. A first end 426 of rod 420 is attached to the cross bar 64 at point 410 as explained above. In order to prevent damage to the body 424 in the event of counterclockwise rotation of the rocker arm assembly 66 far enough to cause contact between the body 424 and the cross bar 64, a rubber bumper 428 is installed on the rod 420 near the connection point 410 of the first end 426 of the rod 420 and the cross bar 64.

An adjustment 450 may be placed between the cross bar 64 and the rubber bumper 428 to limit the counterclockwise movement of the rocker arm 66. The adjustment 450 could be a nut threadedly engaging the rod 420 moveable longitudinally along the rod 420 to alter the position of the rubber bumper 428. Preferably, adjustment 450 would be placed behind the rubber bumper 428 to avoid contact with the body 424, but as one skilled in the art would recognize, the adjuster and the bumper could be one single part moveable longitudinal along rod 420.

Piston 422 sealing engages the interior of the body 424. Piston 422 also includes one or more channels 430 passing longitudinally through the piston 422. Preferably, body 424 is filled with hydraulic oil to create resistance to the piston during relative movement between the piston 422 and the body 424. In order to ensure that no oil leaks from the body 424, the inlet 432 and the outlet 434 of the rod 420 with the body 424 are preferably sealed with rubber rings or any other seals.

Piston 422 also carries one or more valves 442. Valve 442 creates resistance to the oil passing through channels 430. By adding or removing the valves, the damping characteristics of the mechanism 400 can be altered to suit any desired working condition.

The second end 436 of the rod 420 includes an adjustment 440. In the preferred embodiment the adjustment 440 is a nut which is threadedly engaged with the second end 436 of the rod 420. The adjustment 440 allows the amount of rod 420 entering the outlet 434 to be adjusted. This in turns limits the amount of clockwise rotation of the rocker arm assembly 66. In order to prevent damage to the body 420 in the event of contact between the adjustment 440 and the body 424, a rubber bumper 438 is placed on the rod 420 between the adjustment 440 and the body 424. Although the preferred embodiment is shown as having on single rod 420, two rods could be used having a common attachment point at the piston 422, for example.

Mechanism 400 also includes a housing 444. Housing 444 is attached to the body 424 at a first end 446 and to the rear slide rails 12 at a second end 448. Preferably, housing 444 is welded or threaded to the body 424 but as one skilled in the art would recognize, other methods of attachment are available. Housing 444 is preferably shaped to include a window 450 through which access to the adjustment 440 is permitted. This permits the user to adjust certain characteristics of the mechanism 400 without removal of the mechanism 400 from the rear slide rails and the cross bar 64. The second end 448 of the housing 444 is rotatably attached to the transverse bar 402 at point 408 as shown in FIG. 16 and described above.

During rotation of the rocker arm assembly 66, the rod 420 will move the piston 422 relative to the body 424 and cause the piston 422 to travel through the oil. The channels 430 therefor restrict or reduce the speed at which the rocker arm assembly 66 can rotate with respect to the slide rails 12. The valves 442 create additional restriction of the oil through the channels 430 and can be added or removed as needed.

The length of the front slide rails 14 and the rear slide rails 12 within the preferred embodiments are measured from the pivot point 26 to the end of the corresponding slide rail along the longitudinal distance of each rail. Although the preferred ratio of lengths between the front slide rails 14 and the rear slide rails 12 lie within the range of 50% to 100%, any combination of lengths may be used depending on the use of the snowmobile 70 and the riding conditions.

While the invention has been described with the reference to the various disclosed embodiments, it will be understood that various modifications may be made without departing from the spirit and scope of the invention.

What is claimed is:

1. A slide rail system suitable for use on a tracked vehicle having a chassis, two skis, a front drive axle, and an endless track, the system comprising a pair of substantially parallel spaced-apart elongated slide members, the pair being defined by a first slide member and a second slide member, each slide member having a forward end, a rear end and a bottom portion suitable for engaging with the endless track; the forward end of each slide member being suitable for direct connection to the chassis of the tracked vehicle.

2. The slide rail system of claim 1, wherein the forward end of each slide member is suitable for pivotal connection to the chassis of the tracked vehicle.

3. The slide rail system of claim 2, wherein each slide member comprises a front slide rail and a rear slide rail, each front slide rail having a forward end, a rear end and a bottom portion suitable for engaging the endless track and each rear slide rail having a forward end, a rear end and a bottom portion suitable for engaging the endless track; the forward end of the rear slide rail of the first slide member being pivotally connected to the rear end of the front slide rail of the first slide member; and the forward end of the rear slide rail of the second slide member being pivotally connected to the rear end of the front slide rail of the second slide member.

4. The slide rail system of claim 3, wherein each front slide rail has a length and each rear slide rail has a length, and a ratio of the length of each front slide rail to the length of each rear slide rail is in a range of 50% to 100%.

5. A snowmobile, comprising:
   a chassis;
   an engine disposed on the chassis;
   two skis disposed on the chassis;
   a steering column operatively connected to the two skis for steering the snowmobile;
   an endless track disposed below the chassis and being operatively connected to the engine via a front drive axle for propelling the snowmobile; and
   a pair of substantially parallel elongated slide members, each slide member having a forward end, a rear end and a bottom portion engaging the endless track,
   the forward end of each slide member being directly connected to the chassis of the tracked vehicle.

6. The snowmobile of claim 5, wherein the forward end of each slide member is pivotally connected to the chassis of the tracked vehicle.

7. The snowmobile of claim 6, wherein each slide member comprises a front slide rail and a rear slide rail, each front slide rail having a forward end, a rear end and a bottom portion engaging the endless track and each rear slide rail having a forward end, a rear end and a bottom portion engaging the endless track; the forward end of the rear slide rail of the first slide member being pivotally connected to the rear end of the front slide rail of the first slide member; and the forward end of the rear slide rail of the second slide member being pivotally connected to the rear end of the front slide rail of the second slide member.

8. The snowmobile of claim 7, wherein each front slide rail has a length and each rear slide rail has a length, and a ratio of the length of each front slide rail to the length of each rear slide rail is in a range of 50% to 100%.

* * * * *